United States Patent
Buland

(10) Patent No.: US 10,379,242 B2
(45) Date of Patent: Aug. 13, 2019

(54) ESTIMATING INTERVAL VELOCITIES

(71) Applicant: STATOIL PETROLEUM AS, Stavanger (NO)

(72) Inventor: Arild Buland, Sandnes (NO)

(73) Assignee: STATOIL PETROLEUM AS, Savanger (NO)

( * ) Notice: Subject to any disclaimer, the term of this patent is extended or adjusted under 35 U.S.C. 154(b) by 454 days.

(21) Appl. No.: 14/962,905

(22) Filed: Dec. 8, 2015

(65) Prior Publication Data

US 2016/0091621 A1 Mar. 31, 2016

Related U.S. Application Data

(63) Continuation of application No. 13/638,344, filed as application No. PCT/EP2011/054858 on Mar. 29, 2011, now Pat. No. 9,223,043.

(30) Foreign Application Priority Data

Mar. 31, 2010 (GB) .................................. 1005422.9

(51) Int. Cl.
*G01V 1/30* (2006.01)

(52) U.S. Cl.
CPC ...... *G01V 1/303* (2013.01); *G01V 2210/6222* (2013.01); *G01V 2210/665* (2013.01); *G01V 2210/667* (2013.01)

(58) Field of Classification Search
CPC ...... G01V 1/303; G01V 1/305; G01V 99/005; G01V 2210/6222; G01V 2210/667; G01V 2210/665
See application file for complete search history.

(56) References Cited

U.S. PATENT DOCUMENTS

| | | | |
|---|---|---|---|
| 4,766,574 A * | 8/1988 | Whitmore, Jr. | G01V 1/286 367/41 |
| 5,754,493 A | 5/1998 | Al-Chalabi | |
| 6,839,658 B2 | 1/2005 | Causse et al. | |
| 7,493,241 B2 | 2/2009 | Lee | |
| 8,341,984 B2 | 1/2013 | Bachrach et al. | |

(Continued)

OTHER PUBLICATIONS

Dosso, S. & Holland, C. "Geoacoustic Uncertainties From Viscoelastic Inversion of Seabed Reflection Data" IEEE J. Oceanic Engineering, vol. 31, No. 3, pp. 657-671 (2006). (Year: 2006).*

(Continued)

*Primary Examiner* — Jay Hann
(74) *Attorney, Agent, or Firm* — Birch, Stewart, Kolasch & Birch, LLP

(57) ABSTRACT

A method of estimating a velocity of a geological layer includes a. providing a first, initial model including an interval velocity associated with a subsurface location and an uncertainty associated with the interval velocity; b. providing data including an actual or approximated root-mean-square (RMS) velocity associated with a subsurface location and an uncertainty associated with the RMS velocity; and c. estimating a second model including an interval velocity associated with a subsurface location and an uncertainty associated with the interval velocity, based on the interval velocity and the uncertainty of the first model, and the RMS velocity and the uncertainty of the data.

10 Claims, 6 Drawing Sheets

(56) References Cited

U.S. PATENT DOCUMENTS

| | | | | |
|---|---|---|---|---|
| 8,374,836 | B2* | 2/2013 | Yogeswaren | G01V 1/284 703/10 |
| 8,442,770 | B2 | 5/2013 | Bruun et al. | |
| 8,868,348 | B2* | 10/2014 | Li | G01V 1/303 702/18 |
| 8,923,094 | B2* | 12/2014 | Jing | G01V 1/28 703/2 |
| 2010/0074053 | A1 | 3/2010 | Jaiswal et al. | |

OTHER PUBLICATIONS

Abrahamsen P. et al.: "Stochastic Models for Seismic Depth Conversion of Geological Horizons", Society of Petroleum Engineers, SPE23138, Sep. 3, 1991, pp. 329-341, XP002676978.

Dettmer, Jan et al.: "Uncertainty estimation in seismo-acoustic reflection travel time inversion", The Journal of the Acoustical Society America, vol. 122, No. 1, Jul. 2007, p. 161-176.

Hadley D. et al.: "Increasing interpretation accuracy: A new approach to interval to interval velocity estimation", Geophysics: The Leading Edge of Exploration, vol. 7, No. 13, Sep. 1988, pp. 13-16.

Hajnal Z. et al.: "Maximum uncertainty of interval velocity estimates", Geophysics, vol. 46, No. 11, Nov. 1981, pp. 1543-1547, XP55028669.

Jan Dettmer et al.: "Joint time/frequency-domain inversion of reflection data for seabed geoacoustic profiles and uncertainties", The Journal of the Acoustical Society America, vol. 123, No. 3, Mar. 2008, p. 1306-1317, XP55028663.

Landa E. et al.: "Interpretation of velocity estimates from coherency inversion", Geophysics, vol. 56, No. 9, Sep. 1991, pp. 1377-1383, XP55028666.

Lynn W.: "Uncertainity Implications in Azimuthal Velocity Analysis", 2007 SEG Annual Meeting, Sep. 2007, San Antonio, 5 pages.

Zvi Koren et al.: "Constrained DIX Inversion", Geophysics, Society of Exploration Geophysicists, US, vol. 71, No. 6, Nov.-Dec. 2006, pp. R123-R130, XP001500573.

\* cited by examiner

ESTIMATING INTERVAL VELOCITIES

CROSS-REFERENCE TO RELATED APPLICATIONS

This application is a Continuation of U.S. co-pending application Ser. No. 13/638,344 filed on Nov. 7, 2012, which is filed as PCT International Application No. PCT/EP2011/054858 filed on Mar. 29, 2011, which claims the benefit under 35 U.S.C. § 119(a) to Patent Application No. 1005422.9 filed in United Kingdom on Mar. 31, 2010, all of which are hereby expressly incorporated by reference into the present application.

BACKGROUND OF THE INVENTION

1. Field of the Invention

The present invention relates to estimating a velocity of a geological layer, and in particular, relates to estimating Dix interval velocities based on RMS velocity data.

2. Description of Background Art

A number of techniques for exploring the Earth's subsurface have been developed that are based on transmitting waves or signals into a region of the Earth's subsurface. The transmitted signal interacts with the earth and typically a portion of the signal propagates back to the surface where it is recorded and used to obtain information about the subsurface structure, based on how the signal has interacted with the earth. Such techniques typically involve recording amplitudes and travel times of the returned signal.

In seismic imaging applications, seismic waves are transmitted into the earth and may be reflected back, e.g., from subsurface layer interfaces or horizons. Amplitudes of the reflected waves are measured and recorded as seismic time series data. Strong reflections may occur for example at subsurface layer interfaces across which there is a strong contrast in the elastic properties of the layer medium. Prominent reflection events are observed in the time series data that correspond to the strongly reflecting horizons or interfaces. Time series from different horizontal locations may then be processed to align corresponding events and to form an image where the amplitude events can be associated with structural features of the subsurface, for example, in the form of a "seismic section". In this way, a subsurface image of the Earth's subsurface can be formed. However, raw unprocessed time-series data are often hard to interpret and such data therefore typically undergo several further processing steps in order to produce a more representative image of the subsurface.

A problem with raw or initial time series data early in the processing sequence is that the geometric features of the subsurface reflectors are often not accurately represented in the data. For example, the travel times of the time series data may not provide an accurate, correct to scale, indication of the depth of different reflectors and geological structures. This is problematic because accurate geometrical representation is necessary for example for determining where to drill or otherwise assessing a hydrocarbon prospect.

However, since seismic wave propagation is dependent on the seismic velocity of the layer through which it propagates, determination of the seismic velocity of the layers can be used to convert the recorded travel times to distance in terms of depth or as a corrected time.

In order to make an appropriate correction to the seismic reflection data for such purposes, it is desirable to find an accurate and as far as possible a "correct" model of interval seismic velocities of different layers. The interval velocity provides the link to convert the seismic data from the pre-existing time coordinate into a corrected time or depth coordinate system (time or depth migrated domain).

In typical processing flows, a velocity model is conveniently available in the form of a stacking velocity estimate which may be derived during a "stacking" procedure in which seismic traces with common midpoints are corrected for differences in arrival times of corresponding reflection events to remove effects of different source receiver offsets used during acquisition (i.e. Normal move out). This stacking velocity is often taken to represent an RMS velocity. The stacking or RMS velocity differs significantly from the interval velocity. A particular difficulty with it is that the RMS velocity estimate for a particular interface at depth is a type of "average" of the velocities of the layers above the interface in question, such that there is a depth-dependent discrepancy between the RMS and interval velocity.

It is therefore sought to perform an inversion of the RMS velocity data to form an alternative velocity model that provides an improved estimate of velocity structure. This is often done by calculating Dix interval velocities using a well known relationship between the RMS velocities and the interval velocity of a given geological layer n sometimes called the Dix formula (Dix, C. H., 1955, Seismic velocities from surface measurements: Geophysics 20, 68-86):

$$V_n^2 = \frac{U_n^2 t_n - U_{n-1}^2 t_{n-1}}{\Delta t_n} \quad \text{(Equation 1)}$$

where
$V_n$ is the interval velocity in layer n
$U_n$ is the RMS velocity at the bottom of layer n
$\Delta t_n$ is the two-way travel time across layer n Further, it is well-known that the RMS velocity and the interval velocity are related to an instantaneous velocity function as defined by relationships:

$$U^2(t) = \frac{1}{t}\int_0^t V^2(t)\,dt \quad \text{(Equation 2)}$$

$$V_i^2 = \frac{1}{\Delta t_i}\int_{t_{i-1}}^{t_i} V^2(t)\,dt \quad \text{(Equation 3)}$$

where
$V_i$ is the Dix interval velocity in an interval between $t_{i-1}$ and $t_i$
$U(t)$ is the RMS velocity function
$V(t)$ is the instantaneous velocity function
$\Delta t_i$ is two-way travel time across the interval $\Delta t_i = t_i - t_{i-1}$ In layers where the velocity is constant, the instantaneous velocity $V(t)$ is the same as the interval velocity. Further, the Dix interval velocity $V_i$, as defined here, is a local RMS velocity. The relationships of Equations 1 to 3 can thus be used to "invert" the RMS velocities to obtain Dix interval velocities for the time interval between reflection events for which RMS velocities were determined.

The Dix interval velocities which are obtained using Equations 1 to 3 are dependent on the accuracy of the pre-estimated RMS velocities and correct identification of primary reflection events in the data. This can be problematic. The primary reflections are the events where the seismic wave has reflected only once at the geological horizon but there may also be present events where a seismic wave has reflected multiple times from interfaces and these events may interfere and obscure primary reflection events. There are also other sources of uncertainty. It can therefore be difficult for a data interpreter to identify the primary reflections and RMS velocities accurately. Therefore, the RMS velocity estimates are uncertain, which similarly may produce a source of uncertainty of the Dix interval velocities which are estimated from the RMS velocities.

In present techniques for inverting RMS velocity data to Dix interval velocities, uncertainty of this nature is not evaluated or taken into account, and therefore it can be difficult or impossible to assess the significance of the velocities calculated. Without an understanding of those uncertainties it is difficult to make use of the interval velocities, and any further results derived from them, in any quantitative way.

There are also significant limitations in the way that existing technologies take into account geological knowledge from the region. For example, a user may beforehand need to select parameters which affect the actual inversion algorithm such as damping in the inversion, honouring of the input data, and penalising deviation from a background velocity trend. Deciding the relative weighting of these parameters is not particularly intuitive with the result that the existing Dix inversion packages may be hard to use and, conversely, easy to misuse. Moreover, statistical uncertainties attached to the geological knowledge forming the basis for constraining an inversion are not accommodated.

Another limitation of known methods is that interval velocities are typically calculated for the particular intervals defined between high-amplitude reflection events of seismic reflection data. If the RMS velocities from different lateral locations are not available horizon-consistently, at each position for the same reflection event, the velocity data sets from one geographical position to another will be inconsistent, which may limit further applications of the data.

SUMMARY OF THE INVENTION

According to a first aspect of the present invention there is provided a method of estimating a velocity of a geological layer, the method comprising the steps of:

a. providing a first, initial model comprising an interval velocity associated with a subsurface location and an uncertainty associated with the interval velocity;

b. providing data comprising an actual or approximated root-mean-square (RMS) velocity associated with a subsurface location and an uncertainty associated with the RMS velocity; and c. estimating a second model comprising an interval velocity associated with a subsurface location and an uncertainty associated with the interval velocity, based on the interval velocity and the uncertainty of the first model, and the RMS velocity and the uncertainty of the data.

The first model may comprise a plurality of interval velocities at a plurality of subsurface locations, and an uncertainty may be associated with each of the interval velocities. Similarly, the data may comprise a plurality of actual or approximated root-mean-square velocities associated with a plurality of subsurface locations, and an uncertainty may be associated with each of said actual or approximated RMS velocities. The second model may similarly comprise a plurality of interval velocities at a plurality of subsurface locations, and an uncertainty may be associated with each of the interval velocities of the second model. The first model may comprise velocities associated with subsurface locations some of which are different and/or the same as the subsurface locations of the second model and/or the data.

An example of an approximated RMS velocity is a stacking velocity or migration velocity, filtered versions of those, or any other velocity used to represent an RMS velocity. This may include velocities for which it may be desirable to perform a velocity inversion, e.g., as typically done during seismic data processing or interpretation.

The interval velocities of the first model and/or of the estimated second model may be Dix interval velocities. Dix interval velocities are the RMS average of the velocities within a layer, and are not necessarily velocities calculated from Dix's equation (Equation 1), The second model may be represented by a Gaussian distribution. The second model may comprise an expectation value of velocity and a variance or standard deviation representing the uncertainty. In embodiments where the second model includes a plurality of interval velocities, the second model may comprise an expectation vector and a covariance matrix for the interval velocities, wherein the expectation vector describes a trend of interval velocities, and wherein the covariance matrix provides variances representing the uncertainty and provides temporal or spatial covariances between interval velocities in different locations. In such embodiments, the second model may be represented by a multi-Gaussian distribution.

Step c may be carried out by performing a Bayesian inversion of the RMS velocities. The first or initial model may then represent a Bayesian prior model and the method may include forming the second model from a Bayesian posterior distribution. Alternatively, step c may be carried out by performing a constrained least-squares inversion of the RMS velocities. The constrained least-squares inversion is equivalent to the Bayesian inversion only when the prior model, the error and the likelihood model are represented by Gaussian or multi-Gaussian distributions.

The first, initial model may be represented by a Gaussian distribution. The first model may comprise an expectation value of velocity and a variance or standard deviation representing the uncertainty. In embodiments where the first model includes a plurality of interval velocities, the first model may comprise an expectation vector and a covariance matrix for the interval velocities, wherein the expectation vector describes a trend of interval velocities, and wherein the covariance matrix provides variances representing the uncertainty and provides temporal or spatial covariances between interval velocities in different locations. In such embodiments, the first model may be represented by a multi-Gaussian distribution. In the case of a global inversion both a temporal and spatial covariance could be accommodated.

The method may include forming a data error model. The data error model may be represented by a Gaussian distribution. The data error model may comprise a zero expectation value and a variance or standard deviation representing the uncertainty associated with the RMS velocity. In embodiments where the data include a plurality of RMS velocities, the data error model may comprise a zero expectation and a covariance matrix of RMS velocity errors (representing the uncertainty of the RMS velocities of step b), wherein the covariance matrix provides variances and temporal or spatial covariances between the RMS velocity errors in different locations. In such embodiments, the data error model may be represented by a multi-Gaussian distribution. In this way, coloured noise (rather than white noise) associated with the RMS velocity data can be incorporated by appropriate specification of the covariance in the covariance matrix of RMS velocity errors. The step of performing a Bayesian inversion may include forming a likelihood model using the data error model.

The method may include the step of obtaining the data by estimating the RMS velocities and/or variances associated with each of the RMS velocities for representing the uncertainty of the data. Estimating the RMS velocities and variances may be performed by analysing seismic reflection data.

The method includes obtaining the data by forming data pairs which each comprise an RMS velocity and a two-way travel time or depth, or other spatial coordinate.

The method may include the step of forming the first, initial model based on pre-existing knowledge about the sub-surface.

The method may include the step of selecting desired output two-way-time or depths for the estimated interval velocities of the second model.

Step c may include imposing a requirement of smoothness of the interval velocities estimated in step c, for example according to a correlation function.

Step c may include specifying a path, profile, trend line or curve in coordinate space and estimating interval velocities at coordinate positions along the specified path, profile or trend line or curve. This may be for example a pre-determined or specified path in coordinate space such as x,y,z or x,y,two-way time. The specified path may be along an axis, e.g. a horizontal axis, depth axis or time axis. In the case of a depth or time axis, the path may form a "vertical" path extending in a direction of a depth axis or time axis of the data. The specified path may be across an axis, e.g forming an acute angle with at least one of the horizontal axis, depth axis or time axis. Thus, it may form a non-vertical or inclined path extending across a direction of a depth axis or time axis of the data. The inclined profile may be inclined relative to the vertical axis in x,y,z space or time axis in x,y,t space, such that the x,y position may be different at different depth or TWT points for the profile. The inclined profile may be specified along an arbitrary trajectory in space e.g., x,y,t or x,y,z space.

Step c may include the steps of estimating at least one interval velocity for at least one lateral and/or vertical location, e.g., in x,y,z or x,y,t, and predicting the estimated at least one interval velocity and its associated uncertainty onto an arbitrary grid for modelling a subsurface region. The grid may be regular or irregular. The interval velocities may be estimated at any arbitrary location, and then predicted, along with their uncertainties, at further arbitrary locations. This provides total generality. Thus, the interval velocities may be estimated for a set of lateral and/or vertical locations which may be different from or the same as the locations of the grid onto which the velocities are predicted. The grid may be for example a spatial or temporal grid of a sub-surface region.

The method may include forming a prediction model of a subsurface region by predicting, based on the first and second models, interval velocities and an uncertainty associated with at least one of the interval velocities, at arbitrary subsurface locations, e.g. to different lateral and/or "vertical" locations in depth or time.

The step of predicting interval velocities and an uncertainty may be performed by a Bayesian prediction technique. The step of predicting estimated interval velocities and an uncertainty may be performed by a constrained least-squares prediction technique, which is equivalent to a Bayesian prediction under an assumption that uncertainties of the prior model, the error model and likelihood model are represented by Gaussian/multi-Gaussian distributions.

Advantageously, the method may be a method of detecting and/or exploring for hydrocarbons. This may be the case where for example the estimates of interval velocity are used in building a depth or time-migrated image of the Earth's subsurface. In particular, the interval velocities may help to provide seismic data in which seismic amplitude events represent layer boundaries are depicted accurately in depth or in time, i.e. in the depth or the time-migrated domains.

In a second aspect of the invention, there is provided a method of forming a velocity model of a subsurface region, the method comprising:

a. providing a first, initial model comprising a model interval velocity associated with a subsurface model location and an uncertainty associated with the interval velocity;

b. providing data comprising an interval velocity associated with a subsurface data location and an uncertainty associated with the interval velocity; and c. performing a prediction to form a second model comprising a predicted interval velocity and an uncertainty associated with the predicted interval velocity for a subsurface prediction location wherein the prediction is based on the model interval velocities and the uncertainty of the model interval velocity, and based on the data interval velocity and the uncertainty of the data interval velocity.

One or more of the subsurface model location, the subsurface data location and/or the subsurface prediction location may be a different or the same subsurface location.

The first model may comprise a plurality of velocities associated with a set of subsurface model locations and uncertainties associated with each of the velocities. The second model may comprise a plurality of velocities associated with a set of subsurface prediction locations and uncertainties associated with each of the velocities. The set of subsurface prediction locations may be different to or may be the same as the set of subsurface model locations. The data may comprise a plurality of velocities associated with a set of subsurface data locations and uncertainties associated with each of the velocities. The set of subsurface data locations may be different to the set of subsurface model locations and/or to the set of subsurface prediction locations. These sets of model, prediction and data locations may differ in that there may be only a single location that is not common to any two sets of locations. Thus, any two sets may have all locations in common except for one.

Performing the prediction may include predicting an interval velocity of the data from a first data location to a second, prediction location, to thereby determine an interval velocity for the second model for the second location.

Performing the prediction may include predicting the data interval velocities associated with a set of subsurface data locations from the subsurface data locations to a set of subsurface prediction locations, to thereby determine interval velocities for the second model for the set of prediction locations.

Performing the prediction may include using a Bayesian prediction technique. Performing the prediction may include using a constrained least-squares prediction technique.

The interval velocities of the data may be Dix interval velocities and may be obtained from performing an inversion of RMS velocities, such as described above in relation to the first aspect of the invention.

The second aspect of the invention may include further features as described in relation to the first aspect of the invention where appropriate.

BRIEF DESCRIPTION OF THE DRAWINGS

There will now be described, by way of example only, embodiments of the invention with reference to the accompanying drawings, in which.

DETAILED DESCRIPTION OF THE INVENTION

Figure 1:
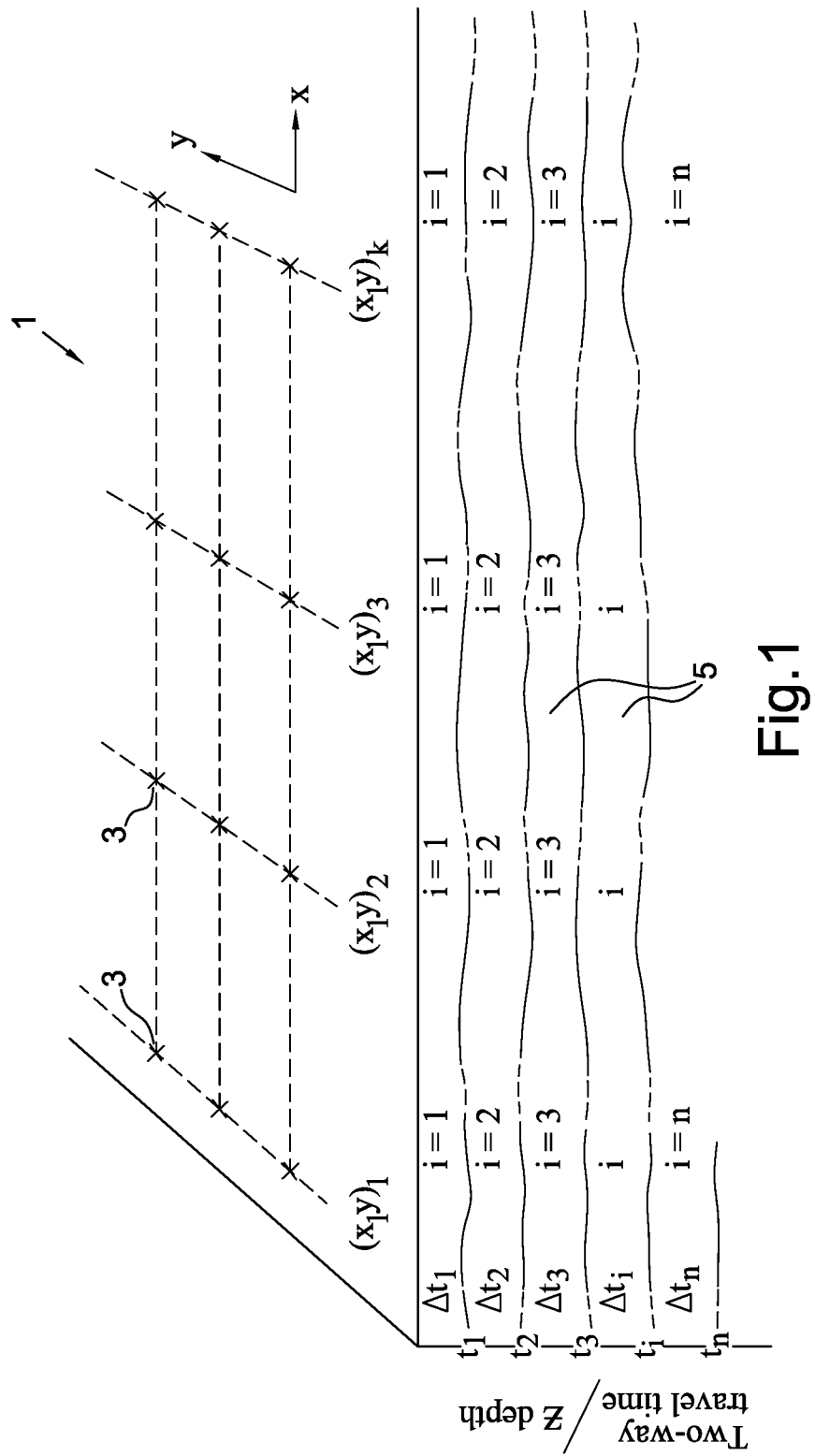
FIG. 1 is schematic representation of a region of the earth containing geological layers.

In this example, an estimate of the Dix interval velocity is obtained from RMS velocity data using the relations of Equations 1 to 3 as outlined above. The estimate in this example is determined by a Bayesian inversion (although in other embodiments a stabilised least squares inversion technique could be used). The Bayesian inversion technique uses Bayes' Rule to provide a solution in the form of a conditional, posterior probability function p(m|d) (the probability of m given d), expressed as:

$$p(m|d) \propto p(d|m)p(m) \quad \text{(Equation 4)}$$

where
m is a vector of model parameters
d is a vector of data
p(d|m) is the likelihood function (the probability of d given m)
p(m) is the prior distribution probability function In the present case, the data d comprises squared RMS velocity values for different travel times. RMS velocity and travel time pairs may be derived during a processing flow of time-series seismic reflection amplitude data for detecting subsurface structure, for example, at the stage of velocity analysis as known in the art of seismic data processing. In practice, the RMS velocities may be approximations to the RMS velocities. The RMS velocities may be approximated by for example stacking velocities or any other velocity that may be taken to represent an RMS velocity.

The prior distribution p(m) in this case provides an initial or prior model (before taking account of the data and its uncertainty) comprising interval velocities and an uncertainty associated with each interval velocity. This initial model may be formed based on knowledge about the subsurface, such as its rock properties, which could for instance be obtained from geological well log samples and tests. The uncertainties may be determined accordingly.

The data d and the prior model p(m) are provided in advance in order determine the posterior distribution p(m|d) and represent inputs in the present implementation, although they are not the only inputs, as described further below.

The likelihood function or "model" p(d|m) in this case incorporates a forward model operator linking the RMS velocity data with the interval velocities of the model solution and an error vector containing uncertainties associated with each RMS velocity datum. This provides a generally non-deterministic link between the model and the data. The uncertainties in the data may be estimated during a seismic data processing step. For example, the processing step of semblance analysis could be modified to allow variances and temporal covariances to be determined. The data uncertainties are a further input to the inversion. The operator linking the squared RMS velocity data d and the squared Dix interval velocity parameters m, are based on the relationships of Equations 1 to 3. Mathematically, the forward model can be expressed as:

$$d = Gm + e \quad \text{(Equation 5)}$$

where
d is the data vector
m is the model parameter vector
G is the forward operator matrix
e is an error vector In this expression, G is the forward operator in the form of an integral/summation matrix, representing the link between the model squared Dix interval velocity parameters m and the data of squared RMS velocities d. The error vector e represents the associated uncertainties of the data. The error vector e constitutes a data error model which may be represented by means of a zero expectation and a set of covariances, and may be multi-Gaussian.

The posterior distribution therefore takes into account pre-existing information, including the prior model of interval velocities and its uncertainties, and the RMS velocity data and its uncertainties, and provides a "best estimate" model including Dix interval velocities and associated uncertainties. Details of the numerical formulation for performing the inversion and determining the posterior distribution for this example are described in Appendix A.

Implementation

As shown in Appendix A, the posterior distribution is characterised by the posterior expectation vector $\mu_{m|d}$ and the associated covariance matrix $\Sigma_{m|d}$ according to the following equations:

$$\mu_{m|d} = \mu_m + \Sigma_m G^T (G \Sigma_m G^T + \Sigma_e)^{-1}(d - G\mu_m) \quad \text{(Equation 6)}$$

$$\Sigma_{m|d} = \Sigma_m - \Sigma_m G^T (G \Sigma_m G^T + \Sigma_e)^{-1} G \Sigma_m \quad \text{(Equation 7)}$$

where
d is the data vector
$\mu_m$ is the prior model expectation vector
$\Sigma_m$ is the prior model covariance matrix
G is the forward operator linking the model to the data
$\Sigma_e$ is the covariance matrix of the error vector of the data
$G\Sigma_m G^T + \Sigma_e = \Sigma_d$ is the covariance of the prior model for the data vector The posterior distribution is determined by evaluating these equations using a computer program. These equations produce squared Dix interval velocities and corresponding covariances. The posterior expectation vector $\mu_{m|d}$ defines the "best estimate" of (squared) Dix interval velocities for different depths. The associated covariance matrix $\Sigma_{m|d}$ provides the corresponding variance for the squared Dix interval velocity in each relevant interval as well as the covariance between each pair of squared Dix interval velocity distributions. These are evaluated from input data and/or user-specified parameters, as detailed below.

With reference firstly to FIG. 1, RMS velocity data are initially obtained in various lateral x,y positions 3 in a geological region of interest 1 where seismic time series reflection data have been acquired. The RMS velocity data typically comprises RMS velocities at several TWT points defining various intervals or subsurface layers 5. The TWT represents the travel time of a seismic pulse. This will include signal paths from the Earth's surface, into the subsurface where it is reflected and back again. In typical data processing procedures, seismic reflection amplitudes are plotted against two way time at different x,y locations. Primary reflections from deeper subsurface layers will tend to arrive at late times in the time series so that different TWTs can be representative of different depths and enable a depth image for a region of the Earth's subsurface to be produced. Generally, it is not determinable from such plots the true geometric structure of the subsurface, for example the true thickness between layers, without further estimating interval velocities of the medium of successive layers of the subsurface, in order to convert raw travel times to migrated time, or to convert the travel time to depth. The velocities may be used to reposition the events in time (i.e. a "corrected travel time" by a process of time-migration), and may be iterated with several steps of velocity analysis where RMS velocities are estimated.

The RMS velocity can be approximated in the seismic data processing procedure, for example by seismic data processors selecting a stacking velocity. Each RMS velocity sample has a standard deviation associated with it, which may be derived when an RMS velocity is estimated from the seismic data. In addition, covariances within the RMS velocities can also be included. The standard deviation and the covariance could be determined upon selection of the stacking velocity.

A prior model is also derived for the geological region 1. This model represents the best knowledge of a user of what the interval velocities should be, without knowledge of the sampled RMS velocity trend. Typically, this may take account of geological knowledge of the region and may include data regarding seismic or elastic rock properties from nearby wells or the like.

Figure 2:
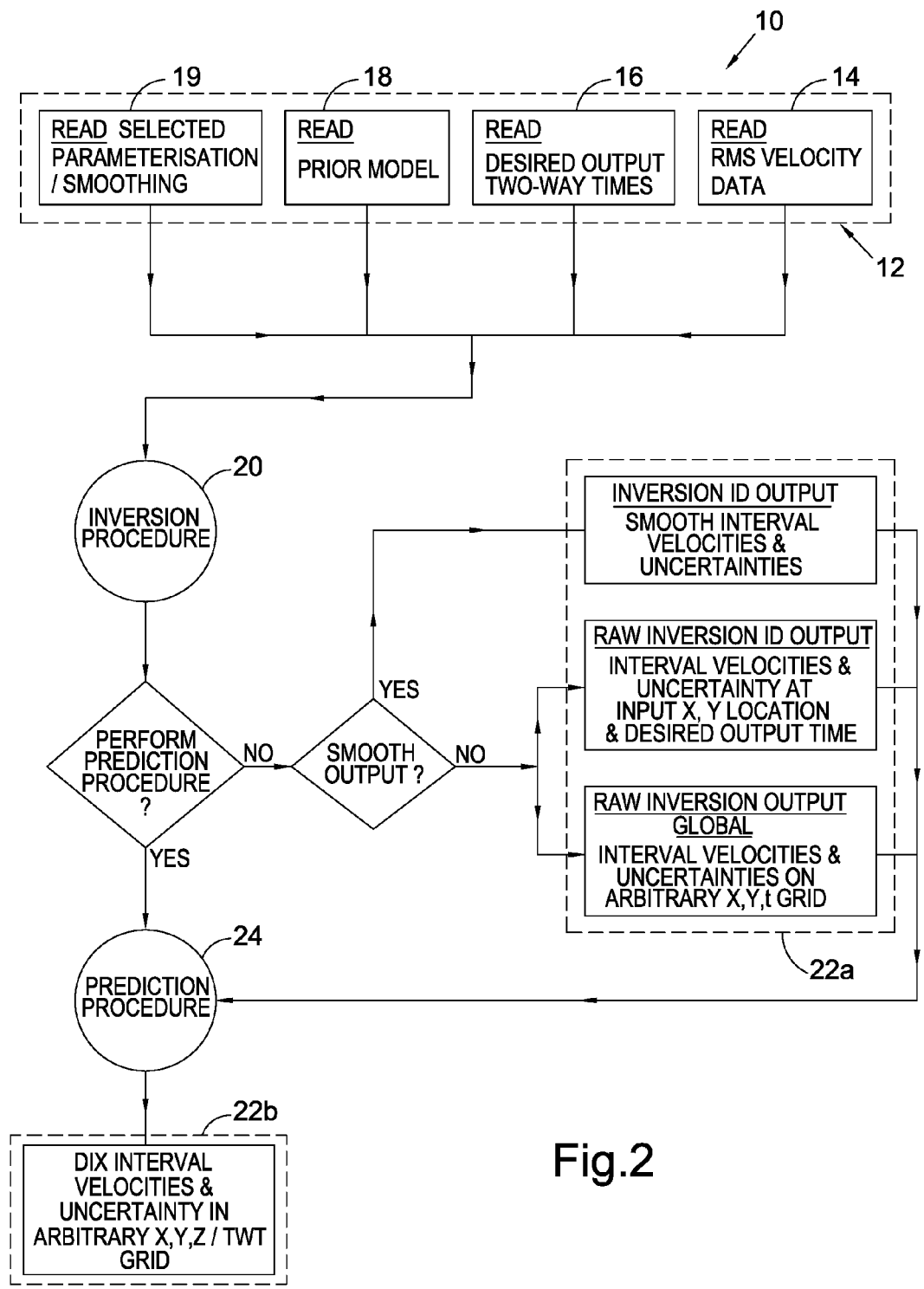
FIG. 2 is a flow chart relating to a method for estimating interval velocities.

In FIG. 2, an example workflow 10 for inverting, in 1D (or globally in 2 or 3 dimensions), the RMS velocity data using Bayes' Rule or equivalently a constrained least squares inversion is shown. The workflow 10 includes an initial stage of reading in various inputs 12, which are then operated on by an inversion routine 20 to evaluate Equations 6 and 7, and thereby generate an output 22a containing Dix interval velocities and associated uncertainties. In the case of a 1D inversion, only the top two options of the output 22a may be produced. As can be seen, the inputs 12 include an RMS velocity data set 14 containing RMS velocities obtained as described above. In practice, the RMS velocity data set 14 comprises collections of TWT-RMS velocity pairs for one or more horizontal (x,y) locations 3, and a standard deviation assigned to each RMS velocity. It will be appreciated that the velocity data locations do not need to be provided on a regular spatial grid.

The inputs 12 include a further set of desired output TWTs 16 which are defined at the same x,y locations as the TWT-RMS velocity pairs of data set 14. The TWTs 16 are used to define time intervals for which Dix interval velocities are to be estimated in the output 22a. The TWTs 16 typically correspond to a top and bottom of the interval for which a Dix interval velocity estimate is desired, and may differ from those of the TWT-RMS velocity pairs of data set 14. Temporal covariances, or in the case of a global inversion additionally spatial covariances, can also be assigned in a suitable covariance matrix for the RMS data.

In addition, the inputs 12 include a prior model 18 comprising expected or "initial guess" interval velocities as a function of x,y and of TWT and a standard deviation associated with each interval velocity. The covariance may also be specified. The "expected" interval velocities of the prior model 18 could be discrete or continuous with TWT provided they can be evaluated for the set of TWTs 16 and x,y locations in which interval velocities estimates are required in the outputs 22a, 22b.

From the inputs, the matrices and/or vectors $\mu_m$, $\Sigma_m$, G, $\Sigma_e$, and d are formed and the posterior distribution p(m|d) determined by the inversion routine 20 in line with Equations 6 and 7. For a 1D inversion as described here, the inversion routine 20 performs the following operations repeated for each lateral (x,y) location. Firstly, the covariance matrix $\Sigma_e$ of the error vector is formed from the standard deviations of the RMS velocities of the data set 14. This is done by squaring the standard deviations to form variances and placing the variances of the RMS velocities on the leading diagonal of the covariance matrix. Temporal covariances between errors on the RMS velocities, if known or estimated on input, are provided in the off-diagonal elements of the covariance matrix.

The prior model expectation vector ($\mu_m$) is then formed comprising the squared "expected" interval velocities of the prior model 18 (the "best guess" model) for the desired TWTs 16 for the output. Thereafter, the prior model covariance matrix ($\Sigma_m$) is formed from the standard deviations associated with the interval velocities of the prior model 18. In a similar manner to the covariance matrix $\Sigma_e$, covariance matrix $\Sigma_m$ for the prior model is formed by squaring the standard deviations to form variances and placing the variances on the leading diagonal of the matrix for each of the desired output TWTs 16. Covariances between parameters in the prior model are included by means of the off-diagonal elements of the covariance matrix $\Sigma_m$.

The operator G of the likelihood model is then formed. This is a discrete matrix representation of the integral of Equation 2. It acts as a summation/integral operator. It is populated from a vector (i.e. a 1×N matrix) of TWT times ($t_i$) of the TWT-RMS velocity pairs of data set 14, and from the desired output TWTs ($t_j$) 16, as follows:

$$G = \begin{bmatrix} \Delta t_1/t_1 & 0 & \ldots & \vdots & \vdots & \ldots & 0 \\ \vdots & & & & & & \\ \Delta t_1/t_i & \vdots & \ldots & \Delta t_j/t_i & 0 & \ldots & 0 \\ \vdots & & & \vdots & & & \\ \Delta t_1/t_N & \vdots & \ldots & \Delta t_j/t_i & \vdots & \ldots & \Delta t_M/t_N \end{bmatrix} \quad \text{(Equation 8)}$$

This is a discrete version of the forward operator that takes a vector of squared interval velocities defined for layers, j, with two-way-time thicknesses $\Delta t_j$ and transforms it into a vector of squared RMS velocities defined at times $t_i$. If $t_i$ lies within the interval j, then $\Delta t_j$ refers to the two-way time from the top of that interval down to $t_i$ only, and not the whole TWT thickness of that interval.

The covariance matrix for the prior model for the data vector $\Sigma_d$ (i.e. $G\Sigma_m G^T + \Sigma_e$) is evaluated and then matrix inverted. The posterior distribution comprising posterior expectation vector $\mu_{m|d}$ and posterior covariance matrix $\Sigma_{m|d}$ are then readily determined using previously formed vectors and matrices.

Having evaluated the posterior expectation vector $\mu_{m|d}$ and the posterior covariance matrix $\Sigma_{m|d}$, the non-squared Dix interval velocity and standard deviations are derived. The posterior expectation vector $\mu_{m|d}$ comprises squared Dix interval velocities for different two-way time intervals j, and the posterior covariance matrix $\Sigma_{m|d}$ provides the variance on the squared Dix interval velocities. However, the non-squared Dix interval velocities V are typically of most interest physically. The expectation value, μ, of the Dix interval velocity V can be estimated from evaluating the equation:

$$\mu = [E(V^2)^2 - \tfrac{1}{2}\mathrm{Var}(V^2)]^{1/4} \quad \text{(Equation 9)}$$

The corresponding standard deviation $\sigma^2$ of the (non-squared) Dix interval velocity vector can be estimated by evaluating the following equation:

$$\sigma^2 = E(V^2) - \mu^2 \quad \text{(Equation 10)}$$

From the standard deviations, confidence intervals for the Dix interval velocities V can be determined. The derivation of the expectation and standard deviations is described further in Appendix A. The Dix interval velocities and standard deviations may then be output in output 22a of the workflow 10.

In a different implementation, all available TWT-RMS velocity pairs and covariances could be input and used to form global matrices of the data and covariances, which can then be inverted to provide an output of Dix interval velocities. The sequence above may then only need to be carried out once.

Figure 3:
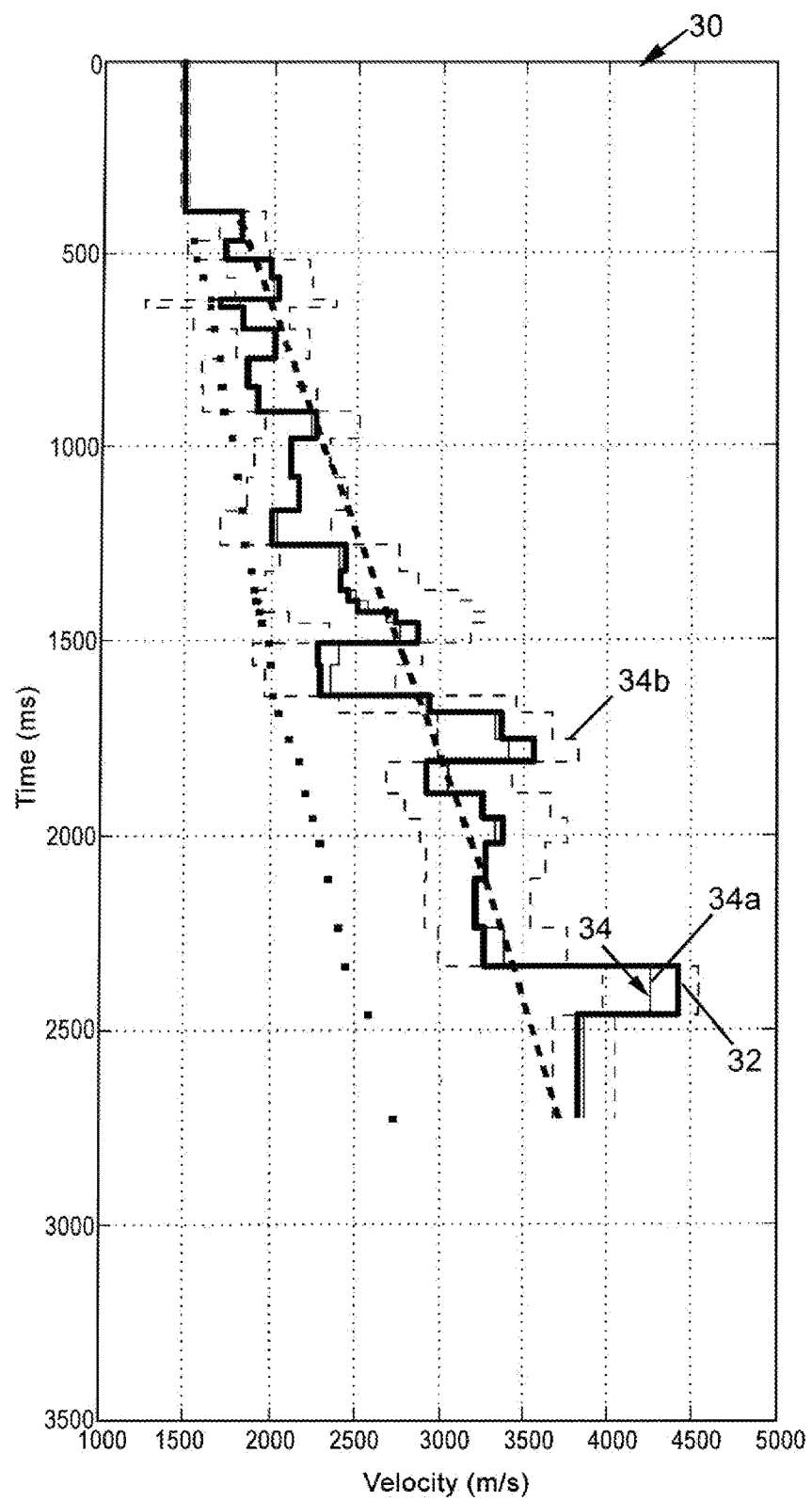
FIG. 3 is a graph showing results from an inversion using a first parameterisation.

FIG. 3 shows an example of the output 22a in the form of a graph 30 of velocity against travel time, showing an interval velocity curve 34 derived from the inversion routine 20 alongside a prior art velocity curve 32, at a single x,y location. The interval velocity curve 34 comprises a best-fit velocity curve 34a and associated uncertainties 34b.

The process above is typically repeated for each x,y location where RMS velocity-TWT pairs of data set 14 have been defined. It will also be appreciated that the sequence of formation of the various matrices may be different in other examples. It is sometimes desirable that the Dix interval velocity estimates are converted to define depth intervals. This may be user-selectable as an input option, or may be done automatically. For example, the program could be designed to output both if desirable.

Selectable Input/Output Parameterisation

In a variation of the 1D inversion method described above, the TWT points of the set of TWTs 16 defining the intervals at which the output is to be determined, and/or the TWTs of the prior model 18, are selectable between three different pre-defined parameterisations, to produce a model output: 1) At the same points in TWT as the input RMS velocities for each x,y location; 2) At an arbitrarily chosen set of points in time; or 3) as a densely sampled or "pseudo-continuous" function of TWT. The parameterisation required can be selected as an extra selection input 19.

These parameterisation options of the selection input 19 seek to provide complete generality of input and output. Any number of data samples and prior model parameters for any TWT position can be used. Similarly, interval velocities can be evaluated at any set of points and/or intervals in terms of TWT or depth, not necessarily corresponding to the same TWT points specified in the input data set 14.

Figure 4:
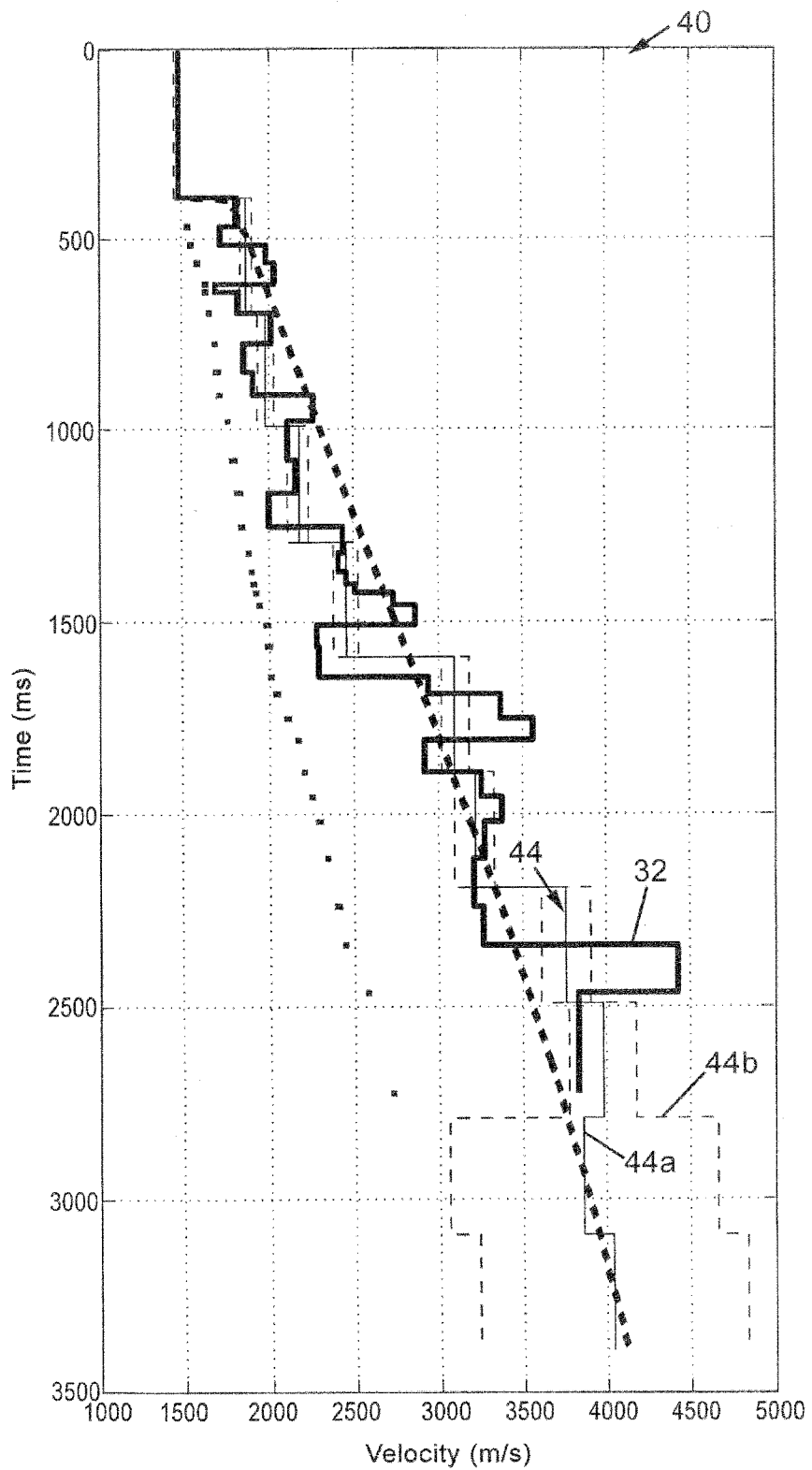
FIG. 4 is a graph showing results from an inversion using a second parameterisation.

The modelling results shown in FIG. 3 are based on the first parameterisation where N=M, i.e. the number of interval velocities is the same as the number of RMS velocities, and each depth/TWT point at which the RMS velocities are provided defines a corresponding top/bottom of the interval over which the interval velocity is determined. FIG. 4 shows similar results to those of FIG. 3, but demonstrates the second parameterisation in which the number of interval velocities is fewer than the number of RMS velocities. Features in FIG. 4 are denoted with the same reference numerals as corresponding or similar features in FIG. 3, but incremented by 10.

It should be appreciated that in other embodiments, a global 2D or 3D inversion may be performed instead of the 1D method above. In this case, the method will be performed in all x,y locations together. In such embodiments, given sufficient computational power, all available RMS velocities could be inverted simultaneously in a single, global, Dix inversion, to predict Dix interval velocities and covariances as a function of arbitrary locations in x,y,t or x,y,z. Alternatively, a 2D or 3D inversion may be performed in a limited range of x,y locations as a sub-set of the whole 3D volume. For example, a cube of the full inversion volume may be defined and the inversion may be performed in respect of that cube, and then the cube may be "moved" sequentially to new lateral positions until estimates for the full volume have been obtained. This may be applied to areas of influence around lateral positions where correlations tend to zero at long distances.

Smoothed Output in TWT/Depth

In a further variation, where a pseudo-continuous output may be specified, the number of specified interval velocities is much larger than the number of picked RMS velocities such that the output of interval velocities is initially represented as a relatively finely sampled discrete series of points with TWT or depth.

When such pseudo-continuous output is specified this is ensured by adding a requirement of smoothness within the inversion itself. This is done by means of a correlation function. This allows the output of stable Dix interval velocities from the inversion with a finer temporal sampling than would be possible without the imposition of such a correlation function (see smooth output option of output 22a).

Many different correlation functions are suitable to achieve this. For example, the correlation function could be an exponential correlation function:

$$C(\Delta\tau) = \exp\left[-3\left(\frac{\Delta\tau}{R}\right)^{v}\right] \quad \text{(Equation 11)}$$

where
Δτ is the time difference between two output points
R is correlation range parameter
v is order of the correlation function between 1 and 2

In this case, the correlation range and correlation order need to be specified. These parameters are user-specified as part of the selection input 19 for the pseudo-continuous parameterisation. The correlation function is imposed within the inversion by modifying the model covariance matrix $\Sigma_m$. This results in a model covariance matrix $\Sigma_m'$, which is similar to $\Sigma_m$, except it now includes non-zero off-diagonal elements which define the covariance of parameters.

Figure 5:
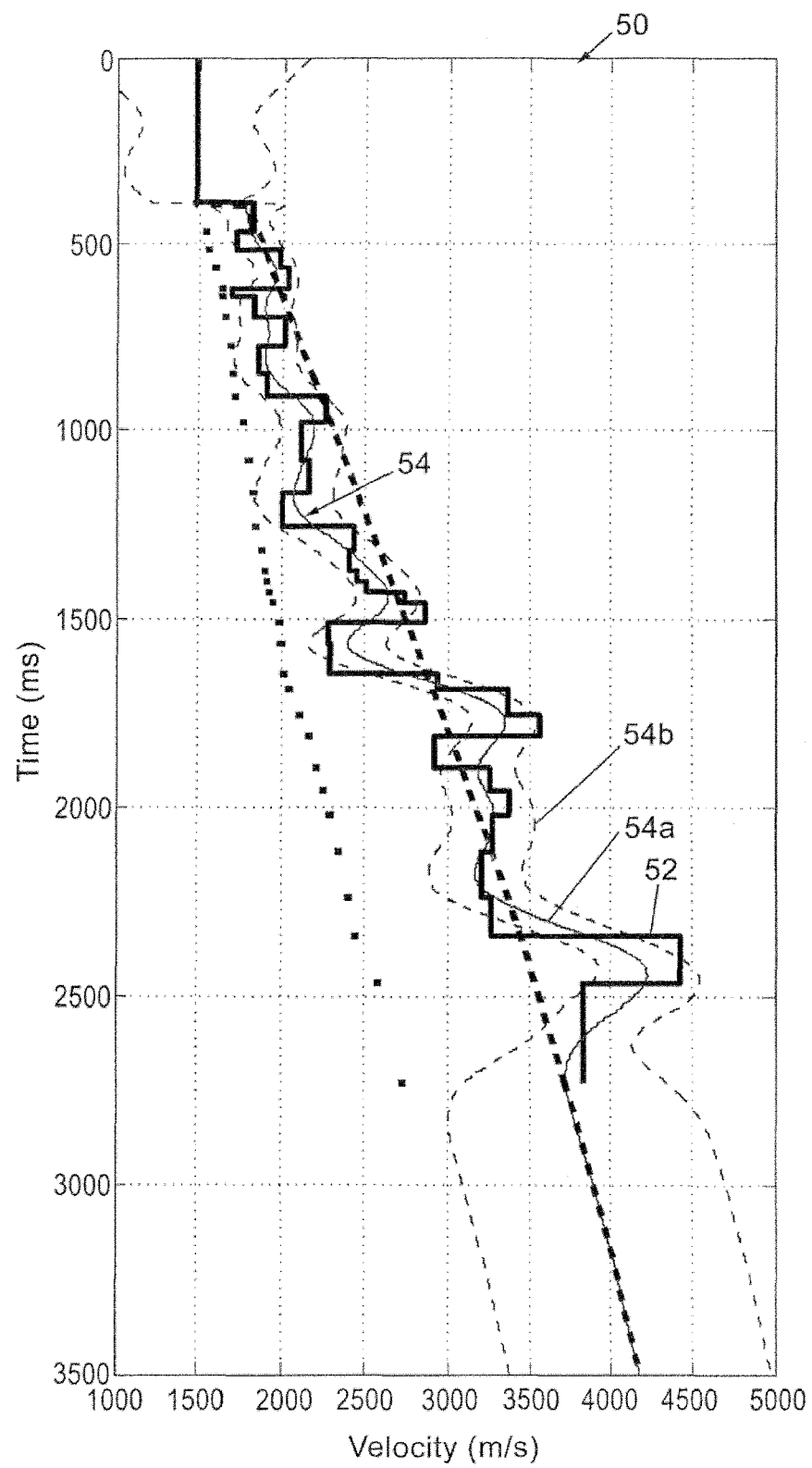
FIG. 5 is a graph showing results from an inversion using a third parameterisation.

FIG. 5 shows interval velocity results for a continuous output using the function above with correlation range R=300 ms and v=1.8. Features in FIG. 5 are denoted with the same reference numerals as similar features in FIG. 3, but incremented by 20.

Prediction Procedure

The method is provided with further flexibility to estimate interval velocities and the associated standard deviations in any x,y,z or x,y,t location based on data from arbitrary, and sometimes sparsely available, x,y,t locations. This allows the interval velocity estimates to be regularised, and mapped onto a grid at a number of finely spaced locations, not only in terms of depth or TWT as described so far, but also in x and y directions, thereby forming a prediction model of the subsurface region.

To do this, a separate 'kriging' or prediction procedure 24 is performed using estimated interval velocities and the associated uncertainties at different x,y,t or x,y,z points, for example, as previously determined via the Dix inversion procedure described above. However, it will be appreciated that interval velocity estimates could be derived from other sources, where each velocity has been assigned an uncertainty, for use in the prediction procedure 24. An appropriate prior model would also need to be determined in this case.

The prediction procedure 24 is also carried out in this example by an implementation of Bayes' Rule, in a similar way to the inversion routine 20 as described above but it will be appreciated that a constrained least squares inversion could be used as an alternative. In this case, interval velocity profiles (i.e. interval velocities with TWT/depth for a particular x,y location) and associated uncertainties from the output 22a of the inversion 20 now act as input data in the form of initial velocity profiles for the prediction procedure 24. The forward model in this procedure can be formulated as:

$$d = v + e \quad \text{(Equation 12)}$$

where
d is a vector of imperfect observations of the velocity
v is a model vector of interval velocities
e is an error vector The observations d are the interval velocities estimated from the Dix inversion procedure and v is a vector which contains in each element the desired velocities to be estimated at each lateral output location. The prior distribution of interval velocities v is Gaussian in a similar way to the velocity inversion procedure described further above. The model matrix of interval velocities thus has a Gaussian prior distribution that has a mean vector $\mu_v$ and covariance matrix $\Sigma_v$. The distribution of the error e is also Gaussian with zero expectation and a covariance matrix $\Sigma_e$.

A correlation function used in constructing the prior covariance matrix constrains the smoothness of a final prediction model solution output 22b containing Dix interval velocity profiles at any x,y,t or x,y,z location. In the presently described example, the correlation function allows the initial profiles to be interpolated smoothly to any x,y,t or x,y,z location, to form new estimates in specified x,y,t or x,y,z locations along with uncertainties. One possible correlation function is:

$$C(\Delta r, \Delta z) = \exp\left[-3\left(\frac{\Delta r}{R_r}\right)^{v_r}\right] \times \exp\left[-3\left(\frac{\Delta z}{R_z}\right)^{v_z}\right] \quad \text{(Equation 13)}$$

where
$\Delta_r$ and $\Delta_z$ are the lateral and vertical distance or separation between two locations
$R_r$ and $R_z$ are lateral and vertical correlation range parameters $v_r$ and $v_z$ are orders of the lateral and vertical correlation functions This function provides a correlation structure for the prior velocity model. It also requires correlation order and length to be specified. These parameters are typically specified as an extra input in the selection input 19. The model results may be mapped into a regular x,y,z or x,y,t grid if desired.

The solution is obtained by evaluating a posterior distribution in terms of the posterior expectation $\mu_{0|d}$ for the velocity in the new arbitrary position $x_0$ and its variance $\sigma_{0|d}^2$ according to the following equations:

$$\mu_{0|d} = \mu_0 | \Sigma_{0v}(\Sigma_v | \Sigma_e)^{-1}(d - \mu_v), \quad \text{(Equation 14)}$$

and $$\sigma_{0|d}^2 = \sigma_0^2 - \Sigma_{0v}(\Sigma_v + \Sigma_e)^{-1}\Sigma_{0v}^T. \quad \text{(Equation 15)}$$

where
$\mu_0$ is an expected interval velocity parameter of the original prior model
d is estimated interval velocities from the inversion
$\mu_v$ is the expected interval velocity of the prior model for the prediction
$\Sigma_v$ is the covariance matrix for the prior model for the prediction
$\Sigma_{0v}$ is the matrix transpose of $\Sigma_{v0}$ a modified covariance matrix formed from the covariance matrix of the original prior model $\Sigma_0$ multiplied by the correlation matrix for the correlation function C
$\sigma_0$ is a standard deviation of the original prior model In the present example of lateral prediction, evaluation of these equations 14 and 15 is carried out in the following steps. The initial interval velocity profiles (output from inversion 20) are contained in the vector d. In order then to perform the prediction to arbitrary x,y locations, the desired output grid onto which the velocity profiles are to be estimated is first determined, and then the separation between each pair of desired x,y grid locations is calculated. Correlation length and order parameters for the correlation function are read in from the selection input 19. Using the correlation range and order and the separations between locations, the correlation function above is evaluated, and the correlation values are used to form the modified covariance matrix $\Sigma_{v0}$ and its transpose $\Sigma_{0v}$. This matrix provides a model of the covariance between a velocity $V_0$ to be predicted in a new arbitrary position $x_0$ and the observed velocities of d. Specifically, it incorporates the lateral spatial correlation according to the function of Equation 13.

The prior model for the prediction procedure is then formed. This prior model is based on a combination of the original prior model 18 as used in the inversion 20, and the estimated model of interval velocities (including uncertainties) from the inversion output 22a. The parameter $\mu_0$ represents an interval velocity value of the original prior model 18 at a particular depth or TWT location. The prior model for the prediction procedure is then defined by an expectation $\mu_v$, which is the value of the interval velocity of the original prior model 18 evaluated at desired output positions, and by an uncertainty associated with each interval velocity which is contained in the covariance matrix for the prior model $\Sigma_v$.

The equations above can then be evaluated, providing as a result the values of interval velocity $\mu_{0|d}$ in the predicted positions with an associated variance $\sigma_{0|d}^2$.

Finally, a correction is applied to the values of interval velocity and variance to take account of using the (original) prior model twice (first in constraining the inversion and then in the prediction procedure). The corrected values are given respectively by these relationships:

$$d = \mu_v + \frac{(\sigma_v^2 + \sigma_e^2)}{\sigma_v^2}(\mu_{v|d} - \mu_v) \quad \text{(Equation 16)}$$

$$\sigma_e^2 = \frac{(\sigma_v^2 \sigma_{v|d}^2)}{\sigma_v^2 - \sigma_{v|d}^2} \quad \text{(Equation 17)}$$

The results from Equations 16 and 17 represent the final output 22b from the prediction procedure 24. An example set of such results is shown in a graph 100 of FIG. 6 for a depth slice at 1500 m. The y-axis represents velocity whilst the x-axis represents lateral distance. The graph 100 shows a smooth curve 110 comprising a best-fit velocity 110a and its uncertainty 110b having applied the prediction procedure. For comparison, it also shows a curve 112 containing the raw interval velocities 112a and uncertainties 112b from the inversion.

Figure 6:
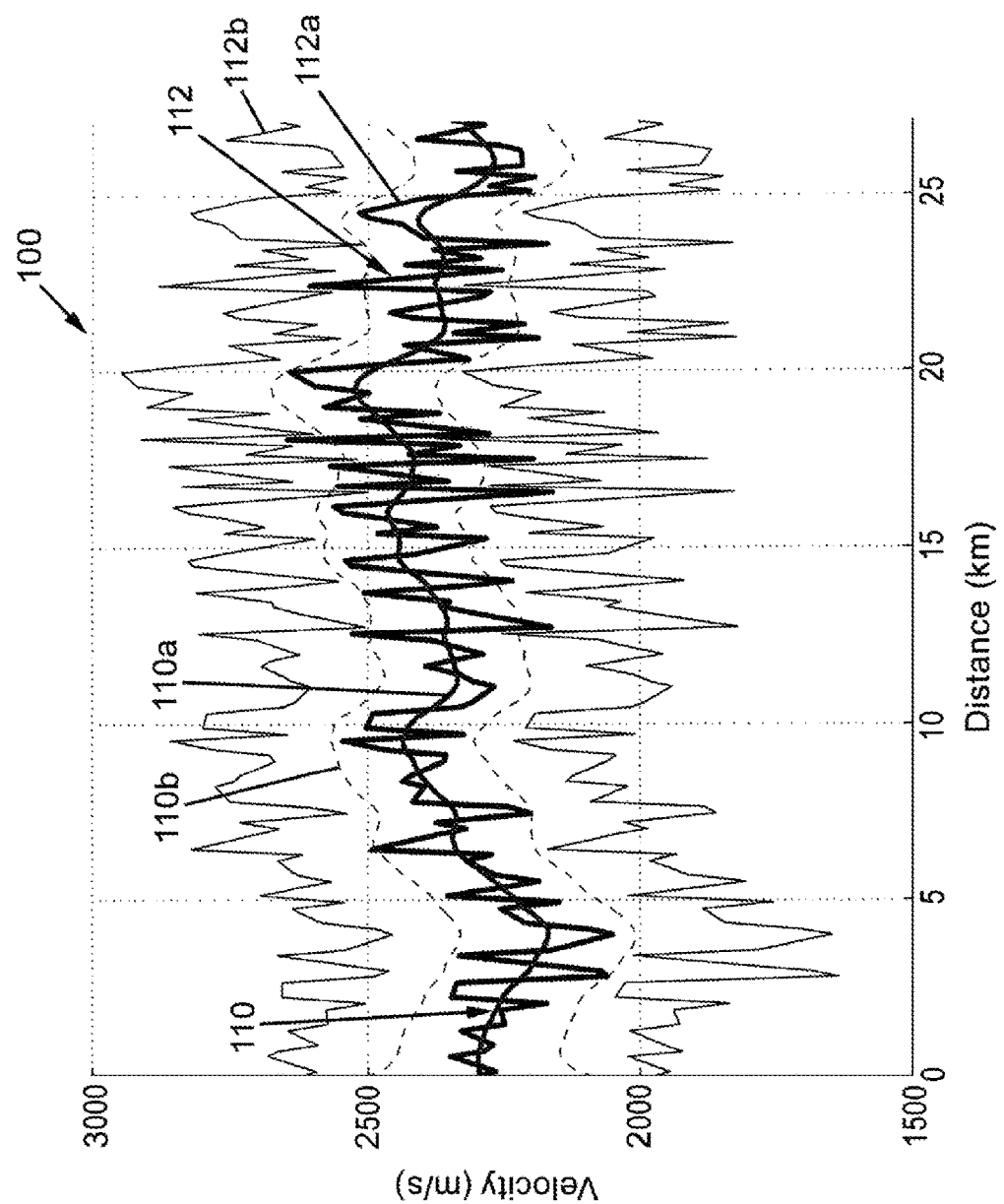
FIG. 6 is a graph showing results following a lateral prediction procedure applied to interval velocity data at a depth of 1500 m.

Although FIG. 6 is in the form of a 2D graph, typically the interval velocity and uncertainty distribution is provided in grid form, for example in x,y,z or x,y,TWT positions, suitable for providing a 2D or 3D spatial image of the velocity structure of the earth's subsurface.

The derivation of the numerical implementation of the prediction procedure is described in further detail in Appendix B.

In general it is preferable to implement the present method to provide maximum flexibility for a user in specifying and handling the inputs 12 and outputs 22a, 22b. For example, it may be desirable for a user to be able to easily incorporate prior information from different sources and it may be desirable to be able to freely specify prior model interval velocity values, uncertainties attached to one or more of those values, the desired x,y,t and optionally x,y,z output locations for the inversion and prediction procedure. Further, it may be designed to accommodate RMS velocity data and uncertainties in various formats as may be produced from different industrial software packages. It may also allow manual or automatic input of some or all of such data. In addition, it may allow selection of the smooth or discrete output, and control of correlation parameters for smoothing vertically or in TWT in relation to the velocity inversion and in the prediction procedure.

It may also be desirable to select the nature of calculation for example to perform a global velocity inversion of RMS velocities for a large range of x,y locations simultaneously in parallel, rather than perform successive inversions in sequence for different x,y locations as described in examples above.

The present invention provides significant advantages, and the flexibility of input and output is particularly beneficial. It allows inclusion of information about the expected distribution of interval velocity with TWT from any source, and is not limited to a set of particular functional forms. Output of velocities onto an arbitrary grid makes it easier to obtain structure-consistent interval velocities even when input RMS velocities have not been picked along the same time horizons that define the structure. Another advantage is the flexibility of time sampling provided by the different output parameterisations from the inversion. Moreover, specifying uncertainties and prior knowledge as inputs provides a simpler, clearer and more intuitive way to constrain the inversion.

A particularly important advantage is that the method includes a priori information and estimated uncertainty in the inversion in a statistically correct and flexible way. It is therefore possible to use the measures of uncertainty provided in the inputs and the outputs to better understand the reliability of estimated interval velocities. This applies both to x,y,TWT or x,y,z images of velocity distribution.

As a user can specify a prior model and its uncertainty and estimate uncertainties in the input data, the effects of the prior information and velocity uncertainty on the model estimation can be assessed. In particular, a user can explore such effects on seismic imaging algorithms that use interval velocities (in TWT or depth). Further, where the RMS velocities are obtained from seismic reflection sections, the results of the present method can help to interpret the sources of error contributing to a mis-tie of well data with seismic reflection data.

In the time domain (e.g. TWT output), the inversion results can be used to facilitate interpretation of features, for example to help assess the likelihood of particular structural features being present in a seismic reflection section such as whether there is structural closure above a reservoir.

Since there is an uncertainty attached to the velocity, the uncertainty in the geometrical structure seen in a depth converted image can also be assessed. In turn, it is possible therefore to make best- and worse-case calculations of reservoir volumes, based on the structures seen in the depth images, such that the commercial risks can be calculated.

In a similar manner, the results can advantageously be used to estimate probability distributions of other physical properties (e.g., resistivity) of the subsurface which may have a theoretical or empirically-derived relationship with interval or instantaneous velocity. Further, it may also be possible to perform a quantitative assessment of uncertainties on other geological estimates that are based on interval velocities, such as geological uplift estimates.

The Dix interval velocity distribution from the present method may be used in other contexts, for example incorporated in stochastic seismic modelling or stochastic seismic inversion for producing a model of reflectivity or more typically impedance characteristics of the subsurface.

Various modifications may be made without departing from the scope of the invention herein described. For example, it will be appreciated that the method could be applied to form a prior model including previously known surface seismic interval velocities and well constrained vertical velocities from well data in a statistically correct way for depth conversion. Further, the velocity trend of the prior model could be interpolated between well locations with an uncertainty that depends on the distance from the nearest well data location.

It will be appreciated that although a Bayesian inversion technique is described above, the interval velocities may be estimated by a constrained least-squares inversion of the data. In such an embodiment, the expectation vectors and associated covariances used in the examples above are used as inputs to the least-squares inversion. The constrained least-squares inversion is equivalent to the Bayesian inversion only when the prior model, the error and the likelihood model are represented by Gaussian or multi-Gaussian distributions.

Appendix A

This appendix describes the underlying derivation of the posterior distribution from which the estimate of Dix interval velocities with associated uncertainties is obtained.

The simple linear relation between the squared interval velocities and the squared RMS velocities is $$U_n^2 = \frac{1}{t_n} \sum_{i=1}^n V_i^2 \Delta t_i$$

and the following defines the relation between squared RMS velocities and the instantaneous velocity $$U^2(t) = \frac{1}{t} \int_0^t V^2(t) dt.$$

These equations propose a practical choice of data and model parameters. Let the data vector d contain the squared RMS velocities picked from velocity analysis $$d = [U_1^2, U_2^2, \ldots, U_N^2]^T$$

and let m be the unknown squared interval velocities $$m = [V_1^2, V_2^2, \ldots, V_M^2]^T$$

where N is the number of picked RMS velocities, and M is the number of interval velocities to be predicted. In classical Dix inversion as defined in $$V_n^2 = \frac{U_n^2 t_n - U_{n-1}^2 t_{n-1}}{\Delta t_n}$$

N=M, but we will also allow for estimation of M interval velocities where M is smaller or larger than the number of picked RMS velocities N.

The relation between the squared picked RMS velocities in d and the unknown squared interval velocities in m can be written $$d = Gm$$

where G is an integral or summation operator with dimension N×M, $$G = \begin{bmatrix} \Delta t_1/t_1 & 0 & \ldots & \vdots & \vdots & \ldots & 0 \\ \vdots & & & & & & \\ \Delta t_1/t_i & \vdots & \ldots & \Delta t_j/t_i & 0 & \ldots & 0 \\ \vdots & & & \vdots & & & \\ \Delta t_1/t_N & \vdots & \ldots & \Delta t_j/t_N & \vdots & \ldots & \Delta t_M/t_N \end{bmatrix}$$

or simply defined as $$G_{ij} = \begin{cases} \frac{\Delta t_j}{t_i} : & \sum_{k=1}^j \Delta t_k \leq t_i \\ 0: & \sum_{k=1}^j \Delta t_k > t_i \end{cases}$$

where $t_i$ is the two-way travel time corresponding to RMS velocity $U_i$, and $\Delta t_j$ is the two way travel-time thickness of interval or layer j. If $t_i$ is within interval j, then $\Delta t_j$ represents the thickness in two-way time from top of interval j to $t_i$.

The errors in the picked RMS velocities are assumed to be additive $$d = Gm + e$$

where the error vector e has dimension N×1. In general, the RMS velocity uncertainty can be estimated from semblance analysis and gather flattening and stack sensitivity. Usually the uncertainties increase with depth, but the uncertainty may also increase at shallow depths due to the limited offset range available where far offset data may be muted to avoid other, undesirable effects on the data. This form does not explicitly include error in the time $t_i$ of a picked RMS velocity $U_i$ but this can indirectly be accounted for as an error in the RMS velocity. The statistical properties of the error can generally be described by a probability density function (PDF) denoted p(e). The forward model together with the statistical error model define the likelihood model p(d|m).

Geophysical inversion problems are often solved using the least squares approach. In a statistical setting, this is closely related to the Gaussian assumption. If we assume that the error vector e is multi-Gaussian with zero expectation and covariance matrix $\Sigma_e$, compactly denoted $$e \sim N(0, \Sigma_e)$$

then the likelihood function p(d|m) is Gaussian with expectation vector Gm and covariance matrix $\Sigma_e$, $$d|m \sim N(Gm, \Sigma_e)$$

where ~ means "distributed as". Note that the covariance matrix allows for varying uncertainty for the different picked RMS velocities, and may also model covariances between the RMS velocity errors. The special case of uncorrelated (white) errors defines a diagonal covariance matrix.

Assume further the prior model p(m) can be represented by a multi-Gaussian distribution with expectation vector $\mu_m$ and covariance matrix $\Sigma_m$, denoted $$m \sim N(\mu_m, \Sigma_m)$$

where the expectation vector represents the velocity depth trend for the M intervals, and the M×M covariance matrix contains the prior variances on the diagonal representing the prior trend uncertainty, and the off-diagonal elements represent spatial covariance.

In this linear Gaussian case, an elegant way of finding the posterior distribution is to define the Gaussian joint distribution for m and d and then use a standard result for the conditional distribution for m given d, see text books on multivariate statistics (e.g. Anderson, T. W., 1984, An introduction to multivariate statistical analysis: John Wiley & Sons Inc). In general, a prior distribution for the data vector (before the data are available) can be derived from the likelihood model and the prior model by the integral:

$$p(d) = \int p(d|m) p(m) dm$$

In the linear Gaussian case, the prior model for the data vector is also Gaussian $$d \sim N(G\mu_m, G\Sigma_m G^T + \Sigma_e)$$

If we assume that the error vector e and the model parameter vector m are stochastic independent, the covariances are $$Cov(d, m) = Cov(Gm + e, m) = G\Sigma_m$$

and $$Cov(m, d) = Cov(m, Gm + e) = \Sigma_m G^T$$

The joint distribution of the model parameter vector m and the data vector d can now be written:

$$\begin{bmatrix} m \\ d \end{bmatrix} \sim N\left( \begin{bmatrix} \mu_m \\ G\mu_m \end{bmatrix}, \begin{bmatrix} \Sigma_m & \Sigma_m G^T \\ G\Sigma_m & G\Sigma_m G^T + \Sigma_e \end{bmatrix} \right)$$

and the posterior distribution is defined by the conditional Gaussian distribution for m given d:

$$m|d \sim N(\mu_{m|d}, \Sigma_{m|d})$$

where the posterior expectation vector is $$\mu_{m|d} = \mu_m + \Sigma_m G^T (G\Sigma_m G^T + \Sigma_e)^{-1}(d - G\mu_m)$$

and the posterior covariance matrix is $$\Sigma_{m|d} = \Sigma_m - \Sigma_m G^T (G\Sigma_m G^T + \Sigma_e)^{-1} G\Sigma_m.$$

The complete solution for the squared interval velocities is defined by a multi-Gaussian distribution with explicit expressions for the posterior expectation vector and posterior covariance matrix. The posterior expectation represents a stabilized optimal solution in the least squares sense, and the covariance matrix contains the uncertainties and parameter covariances. Since the vector of squared interval velocities is multi-Gaussian, the marginal distribution for the squared interval velocity is a specific layer is also Gaussian. This means that the marginal distribution for the squared interval velocity in layer i, $p(V_i^2)$, is completely described by element i in the posterior vector $\mu_{m|d}$ and the corresponding variance element on the diagonal of the posterior covariance matrix $\Sigma_{m|d}$.

The forward model and the Dix inversion above is defined for a system of squared RMS velocities and squared interval velocities, but usually we are interested in the interval velocity itself. The distribution of the interval velocity V and the squared velocity $V^2$ cannot both be Gaussian, but if the standard deviation is small relative to the expectation, this is a good approximation. Assume now that V has a Gaussian distribution with expectation $\mu$ and standard deviation $\sigma$, $$V \sim N(\mu, \sigma^2)$$

and assume also that $\mu > 0$ and $\mu \gg \sigma$ such that we can neglect the probability that V<0.

A standard normal form is obtained by subtracting the expectation value and dividing by the standard deviation:

$$Z = \frac{V - \mu}{\sigma} \sim N(0, 1)$$

and $$V = \mu + \sigma Z \sim N(\mu, \sigma^2)$$

The squared velocity is now $$V^2 = \mu^2 + 2\mu\sigma Z + \sigma^2 Z^2.$$

The squared standard normal random variable is chi-squared distributed with one degree of freedom, $Z^2 \sim \chi_1^2$, with expectation 1 and variance 2. We then get that the expectation of $V^2$ is $$E(V^2) = \mu^2 + \sigma^2$$

and the variance is $$\mathrm{Var}(V^2) = 4\mu^2\sigma^2 + 2\sigma^4.$$

Given that we know the expectation and variance of $V^2$, the inverse relations for the expectation and variance of V are $$\mu = [E(V^2)^2 - \tfrac{1}{2}\mathrm{Var}(V^2)]^{1/4},$$

and $$\sigma^2 = E(V^2) - \mu^2.$$

A total vertical velocity profile can be represented by a Gaussian vector v with posterior expectation vector $\mu$ and covariance matrix $\Sigma$.

Appendix B

This appendix describes the mathematical derivation underlying the prediction procedure used to interpolate the inversion results onto an arbitrary grid in x,y,t or x,y,z.

We assume that the velocity can be modelled as a Gaussian random field. The prior velocity model is defined by the expectation function $\mu(x)$ and the variance function $\sigma^2(x)$, where x is a spatial location coordinate, and a spatial correlation function C(x,y) between the velocities in two positions x and y. The spatial correlation is typically defined by the distance between the two positions, and such that the correlation range is long laterally along the stratigraphy, and shorter vertically. A simple spatial correlation function of an exponential form can be written $$C(\Delta r, \Delta z) = \exp\left[-3\left(\frac{\Delta r}{R_r}\right)^{v_r}\right] \times \exp\left[-3\left(\frac{\Delta z}{R_z}\right)^{v_z}\right]$$

where $\Delta r$ and $\Delta z$ are the lateral and vertical distance between two locations, $R_r$ and $R_z$ are the lateral and vertical correlation range parameters, and $v_r$ and $v_z$ are orders of the lateral and vertical correlation functions, respectively. The variance and correlation functions define the spatial covariance function $\Sigma(x,y)$.

Instead of performing a 3D Dix inversion using all RMS velocity data simultaneously, we here propose a practical two step procedure: First independent 1D Bayesian Dix inversion (as per Appendix A) in all positions with RMS velocity data, and then spatial prediction of velocities in all positions in an arbitrarily sampled cube.

Let us now consider the separate problem of spatial prediction of velocities in arbitrary locations $x_0$ from some sparse observations of the velocity. Assume that we have imperfect observations d of the velocities v in the positions $x_1, x_2, \ldots, x_n$, $$d = v + e,$$

Where $d = [d(x_1), d(x_2), \ldots, d(x_n)]^T$ is the imperfect observations of the velocities, $v = [V(x_1), V(x_2), \ldots, V(x_n)]^T$ is the velocities, and e is an error term. From the assumptions above, the velocities have a Gaussian prior distribution, $$v \sim N(\mu_v, \Sigma_v),$$

where $\mu_v$ and $\Sigma_v$ are the prior mean and covariance. The error vector is assumed to have a Gaussian distribution $$e \sim N(0, \Sigma_e).$$

We now want to predict the velocity $V_0$ in a new position $x_0$ with prior expectation $p_0$ and variance $\sigma_0^2$. Under the Gaussian assumptions above we can now define the joint distribution $$\begin{bmatrix} V_0 \\ d \end{bmatrix} \sim N\left( \begin{bmatrix} \mu_0 \\ \mu_v \end{bmatrix}, \begin{bmatrix} \sigma_0^2 & \Sigma_{0v} \\ \Sigma_{0v}^T & \Sigma_v + \Sigma_e \end{bmatrix} \right).$$

where $\Sigma_{0v}$ is the covariance between $V_0$ and the observed velocities in vector d, and $\Sigma_{0v}$=Cov($V_0$, v), where we assume independence between v and e. According to standard rules of multivariate analysis, we now end up with a Gaussian posterior distribution for the predicted velocity $V_0$, $$V_0|d \sim N(\mu_{0|d}, \sigma_{0|d}^2),$$

with expectation $$\mu_{0|d} = \mu_0 + \Sigma_{0v}(\Sigma_v + \Sigma_e)^{-1}(d - \mu_v),$$

and variance as $$\sigma_{0|d}^2 = \sigma_0^2 - \Sigma_{0v}(\Sigma_v + \Sigma_e)^{-1}\Sigma_{0v}^T.$$

Based on the observed velocities in positions $x_1$, $x_2$, ..., $x_n$ (contained in vector d), the spatial prediction algorithm can now be used repeatedly to predict the velocity in any arbitrary spatial location $x_0$. A typical use will be to fill a densely sampled 3D model, where each cell is defined by the predicted velocity and the associated uncertainty.

Using the Dix velocities as the observed velocities in the spatial prediction algorithm now proposes itself, where the posterior mean and variance from the Bayesian Dix inversion appear as natural candidates for the velocity observations and the error. However, the use of the Bayesian Dix velocities directly will cause double use of parts of the prior information, first in the Dix inversion and next in the spatial prediction. In the spatial prediction, the prior model used in the Bayesian Dix inversion is extended to include lateral correlations to impose lateral smoothness, compare the correlation function used in Appendix B $$C(\Delta r, \Delta z) = \exp\left[-3\left(\frac{\Delta r}{R_r}\right)^{v_r}\right] \times \exp\left[-3\left(\frac{\Delta z}{R_z}\right)^{v_z}\right]$$

with the correlation function used in the main example of the velocity inversion $$C(\Delta \tau) = \exp\left[-3\left(\frac{\Delta \tau}{R}\right)^v\right].$$

It is however possible to wash away the effect of the prior information used in both steps.

For a large data set, the vector d containing the velocity data may be large. However, since the spatial correlations may go to zero at large separations, it may be a good approximation to calculate the velocity $V_0$ using only Dix velocities with a short lateral separation and a significant correlation. Since the Dix velocities are vertically correlated, the value of including values above and below the depth plan defined by $x_0$ is low and thus not used. Let the prior and posterior distribution in a location $x_i$ be $N(\mu_v, \sigma_v^2)$ and $N(\mu_{v|d}, \sigma_{v|d}^2)$ respectively, where index i is suppressed to simplify the notation. We then compute the Dix velocity in location $x_i$ without the effect of the prior $$d = \mu_v + \frac{(\sigma_v^2 + \sigma_e^2)}{\sigma_v^2}(\mu_{v|d} - \mu_v)$$

and the corresponding Dix uncertainty $$\sigma_e^2 = \frac{(\sigma_v^2 \sigma_{v|d}^2)}{\sigma_v^2 - \sigma_{v|d}^2}.$$

The values computed in these expressions for d and $\sigma_e^2$ can be inserted into d and $\Sigma_e$ for location i in the expressions for the expectation $\mu_{0|d}$ and $\sigma_{0|d}^2$ above. This defines a two step procedure of Bayesian Dix and spatial prediction where the repeated use of the prior information is accounted for.

It will be appreciated that this prediction procedure could equally and alternatively be applied to results from the 1D inversion in terms of two-way travel time rather than depth. In the case of applying the technique to velocity depth profiles, a conversion is carried out, for example as part of the inversion routine, to transform two-way times to depths. Data may be converted from two-way seismic travel time t to depth z by the transform $$z(t) = \frac{1}{2} \int_0^t V(f) dt,$$

where V is the estimated Dix interval velocity (posterior expectation).

What is claimed is:

1. A method of imaging a velocity structure of a subsurface region of the Earth, the method comprising:
providing data comprising a data interval velocity of the subsurface and a data uncertainty associated therewith;
determining an output grid onto which velocity profiles are to be estimated, and calculating a separation between each pair of desired grid locations;
using said separation between locations to evaluate a correlation function, and using correlation values to form a covariance matrix that provides a model of a covariance between a velocity to be predicted in a prediction location on said output grid and said data interval velocity;
providing a first, initial model based on said data comprising a first model interval velocity of the subsurface and a first model uncertainty associated therewith;
performing a spatial prediction of the data interval velocity to form a second model comprising a predicted second model interval velocity of the subsurface and a second model uncertainty associated therewith, the predicted second model interval velocity being associated with the prediction location in the subsurface region,
wherein the prediction is performed based on the first model interval velocity and the first model uncertainty, and based on the data interval velocity and the data uncertainty, and based on said covariance matrix;
displaying a 2D or 3D spatial image of the velocity structure of the subsurface region from the second model.

2. The method as claimed in claim 1, wherein the first model interval velocity is associated with a first model location in the subsurface region and the data interval velocity is associated with a data location in the subsurface region, and one or more of the first model location, the data location and/or the prediction location is a different subsurface location.

3. The method as claimed in claim 1, wherein performing the prediction includes predicting an interval velocity of the data from a first, data location, to a second, prediction location, to thereby determine an interval velocity for the second model for the second location.

4. The method as claimed in claim 1, wherein performing the prediction includes predicting a plurality of data interval velocities associated with a set of subsurface data locations from the subsurface data locations to a set of subsurface prediction locations, to thereby determine a plurality of second model interval velocities for the set of prediction locations.

5. The method as claimed in claim 1, wherein performing the prediction includes performing a Bayesian prediction.

6. The method as claimed in claim 1, wherein performing the prediction includes performing a constrained least-squares prediction.

7. The method as claimed in claim 1, wherein the interval velocities of the data are obtained from performing a Dix inversion of actual or approximated RMS velocities.

8. The method as claimed in claim 1, wherein the first model, the data and/or the second model are represented by Gaussian distributions or multi-Gaussian distributions, where the data and the first and second models include a plurality of interval velocities.

9. The method as claimed in claim 1, wherein the first model interval velocity is associated with a first model location in the subsurface region and the data interval velocity is associated with a data location in the subsurface region, and one or more of the first model location, the data location and/or the prediction location is the same subsurface location.

10. The method as claimed in claim 1, further comprising the steps of:
- building a depth or time-migrated image of the Earth's subsurface by using seismic data provided based on the predicted second model interval velocity; and
- detecting or exploring for hydrocarbons based on the depth or time-migrated image of the Earth's subsurface.

* * * * *